United States Patent [19]

Beagle et al.

[11] Patent Number: 5,199,751
[45] Date of Patent: Apr. 6, 1993

[54] PRESSURE HOSE COUPLING COLLAR AND METHOD FOR PRODUCING SAME

[75] Inventors: Leo F. Beagle, Payne; Richard I. Wermer, Hicksville, both of Ohio

[73] Assignee: Dana Corporation, Toledo, Ohio

[21] Appl. No.: 612,188

[22] Filed: Nov. 13, 1990

[51] Int. Cl.⁵ .......................................... F16L 33/207
[52] U.S. Cl. ...................................... 285/256; 29/508; 29/516; 72/68; 72/367
[58] Field of Search ............... 285/256, 259, 258, 242; 29/507, 508, 516, 515, 520, 450, 457; 72/68, 70, 80, 324, 367

[56] References Cited

U.S. PATENT DOCUMENTS

| | | |
|---|---|---|
| 783,545 | 2/1905 | Rowland . |
| 1,614,563 | 1/1927 | Leach et al. . |
| 2,211,147 | 8/1940 | Miller .................... 285/259 X |
| 2,506,657 | 5/1950 | Webster ...................... 72/68 |
| 2,562,116 | 7/1951 | Nelson ................... 285/259 X |
| 2,865,094 | 12/1958 | Press ..................... 285/259 X |
| 3,047,043 | 7/1962 | Albrecht . |
| 3,149,512 | 9/1964 | Leinbach . |
| 3,503,246 | 3/1970 | Shiokawa . |
| 3,530,900 | 9/1970 | Kish ..................... 285/256 X |
| 3,750,444 | 8/1973 | Bittner . |
| 3,877,282 | 4/1975 | Pogonowski . |
| 4,226,446 | 10/1980 | Barrington ............... 285/259 X |
| 4,335,753 | 6/1982 | Frye . |
| 4,629,220 | 12/1986 | Crusco ....................... 285/256 |
| 4,691,550 | 9/1987 | Dietzel . |
| 4,852,380 | 8/1989 | Haldric et al. . |
| 4,867,485 | 9/1989 | Seckel ................... 285/259 X |
| 4,923,226 | 5/1990 | Bartholomew ............. 285/242 |

FOREIGN PATENT DOCUMENTS

| | | |
|---|---|---|
| 2332476 | 6/1977 | France . |
| 309199 | 7/1971 | U.S.S.R. ..................... 285/256 |
| 809797 | 3/1959 | United Kingdom . |

Primary Examiner—Dave W. Arola
Attorney, Agent, or Firm—MacMillan, Sobanski & Todd

[57] ABSTRACT

A metal collar which is used to construct a coupling for a flexible pressure hose includes a plurality of inner annular beads which are formed by a single stamping operation. Each inner bead is formed to define an annular flat surface facing one end of the collar, and which assists in gripping the hose end. When formed, the collar will also include a plurality of corresponding outer annular grooves opposite the inner annular beads. The stamping operation is performed by a forming apparatus which includes a collapsible, segmented outer die assembly and a coaxially positioned expandable inner die assembly. Due to the segmented construction of the die assemblies, the annular flat surfaces of each of the beads are not continuous, but are formed with a plurality of circumferentially spaced interruptions.

8 Claims, 3 Drawing Sheets

PRESSURE HOSE COUPLING COLLAR AND METHOD FOR PRODUCING SAME

BACKGROUND OF THE INVENTION

This invention relates in general to a coupling which is adapted to be crimped to an end of a flexible pressure hose and in particular, to a unique metal collar, which forms part of the coupling, and is adapted to be crimped over the end of a pressure hose.

Pressure hose couplings are used in many places to connect flexible pressure hoses to moveable machinery parts. Such hoses transmit hydraulic fluids or compressed air under high pressure between such components as pumps, valves, and hydraulic actuators. The flexibility of the hose permits relative movement between such devices.

One example of a prior art hose coupling and the associated metal collar is shown in FIGS. 1, 2 and 3. Referring first to FIG. 3, there is shown a prior art pressure hose coupling, generally indicated by the reference number 10, which has been secured to one end of a flexible pressure hose 11. The coupling 10 includes a nipple 12 and a metal collar 13, with the collar 13 being coaxially positioned around one end of the nipple, and being crimped to an intermediate portion 14 of the nipple 12. The collar 13 and one end 15 of the nipple 12 cooperate to form an annular space into which the flexible hose end 11 is inserted. Once inserted, the outer surface of the nipple end 15, which is typically provided with a series of annular teeth, will sealingly engage the inner surface of the hose end. The opposite end of the nipple 12 can have external threads 16 as shown in FIG. 3, or with other means for attachment to an associated connection point.

The particular collar 13 which forms part of the hose coupling shown in FIG. 3 is shown in more detail in FIGS. 1 and 2. As shown in FIG. 2, the collar is provided with a series of axially spaced apart annular grooves 17 formed on an inner surface thereof which, when crimped about the associated hoses, securely grip the outer surface of the hose to securely attach the hose to the coupling. It has been found that, in high pressure applications, it is necessary to provide the annular grooves with generally flat surface portions 18 to prevent the hose from being disconnected from the coupling. The grooves 17 shown in the metal collar 13 of FIGS. 1 and 2 are typically formed by a machining operations, such as on a screw or lathe machine. As can be appreciated, the machine operation is a relatively time consuming and expensive operation, and requires that the metal tube have a sufficient wall thickness to accommodate the grooves.

An alternate method of forming metal collars for hose couplings is disclosed in U.S. Pat. No. 4,691,550. In this patent, the interior grooves of the above described collar are replaced by raised annular beads that are individually formed on the interior of a cylindrical metal sleeve by a pressing operation. The pressing operation can be either roll forming, in which case the beads are continuous, or by a collapsible segmented die, in which case the beads will include circumferential interruptions. After each bead is formed, a stamping die is inserted into the sleeve and impressed against the the bead to form a continuous annular toothed gripping surface thereon. While this process enables a thinner walled sleeve to be used, a separate pressing and then stamping operation is required to individually form each internal bead.

SUMMARY OF THE INVENTION

The present invention concerns a method of producing a cylindrical metal collar for subsequent attachment to a flexible pressure hose wherein a plurality of internal annular beads are formed in the metal collar by a single stamping operation. In particular, the invention utilizes a forming apparatus which includes a collapsible segmented outer die assembly having a plurality of inwardly projecting annular ribs, and a coaxially positioned expandable segmented inner die assembly provided with cooperating annular grooves. A cylindrical metal sleeve is then placed in coaxial relationship between the outer collar and the inner mandrel, and the inner die assembly is expanded, while the outer die assembly is collapsed, to simultaneously form all the beads in a single stamping operation.

In addition to forming the inner annular beads, the stamping operation also forms a plurality of corresponding outer annular grooves opposite the beads. Also, since the die assemblies are segmented, the annular flat surfaces will not be continuous, but will each include a plurality a circumferentially spaced interruptions.

The method of the present invention results in a very efficient and economical process for producing hose coupling collars. Other advantages of the invention will be apparent to one skilled in the art from reading the following detailed description of the invention in conjunction with the attached drawings.

DESCRIPTION OF THE PREFERRED EMBODIMENT

Figure 1:
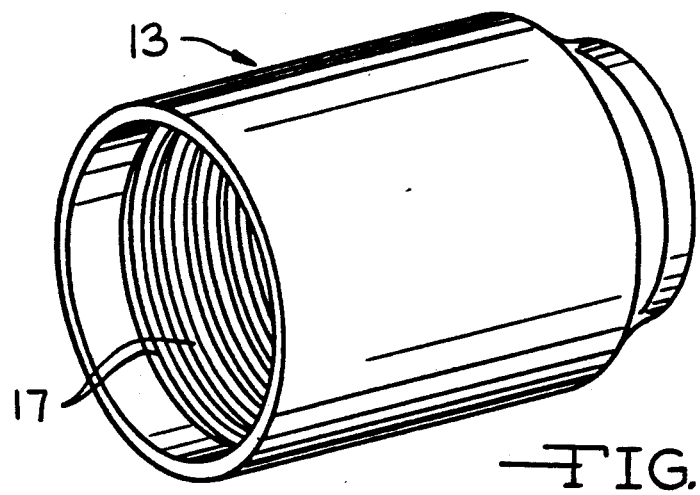
FIG. 1 is a perspective view of a prior collar used to construct a coupling for a flexible pressure hose.
Figure 2:
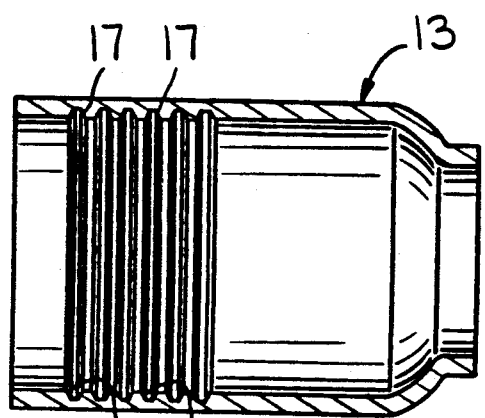
FIG. 2 is a sectional view of the prior art collar of FIG. 1.
Figure 3:
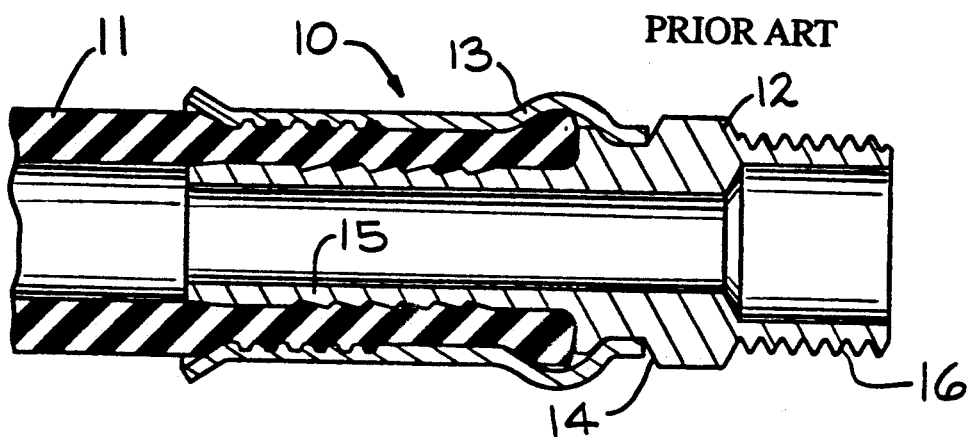
FIG. 3 is a sectional view of a prior art coupling which has been crimped to the end of a flexible pressure hose.
Figure 4:
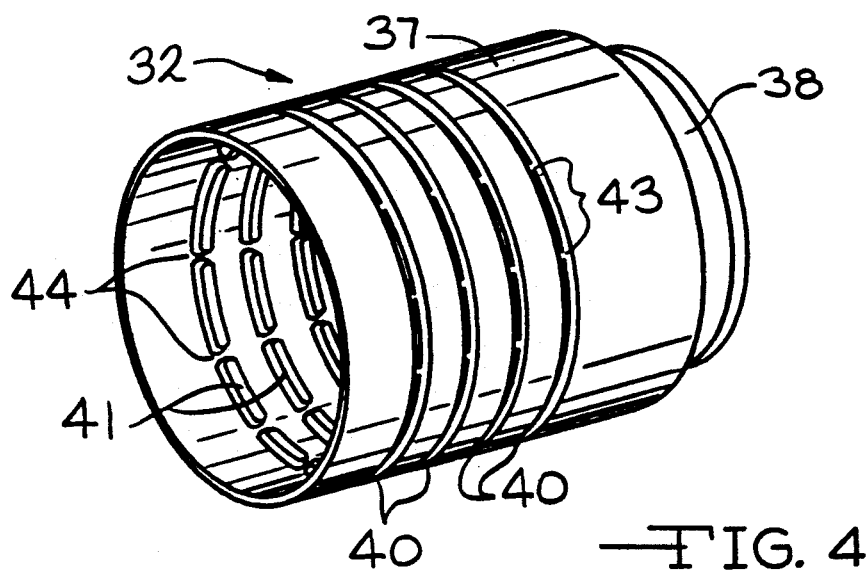
FIG. 4 is a perspective view of a pressure hose coupling collar formed in accordance with the present invention.
Figure 5:
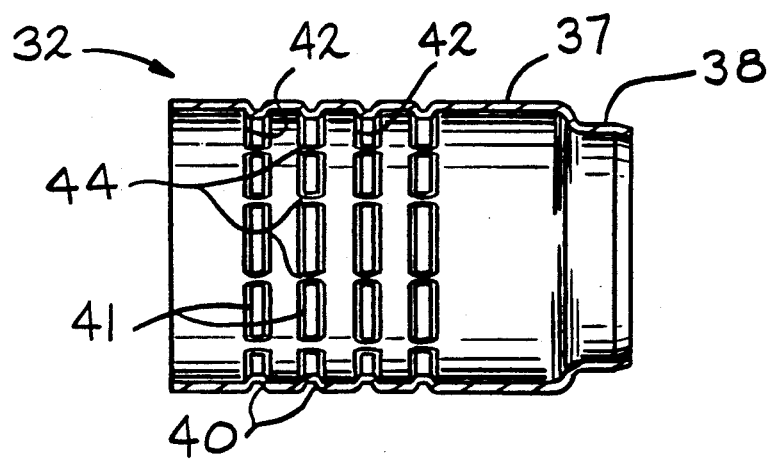
FIG. 5 is a sectional view of the collar of FIG. 4.
Figure 6:
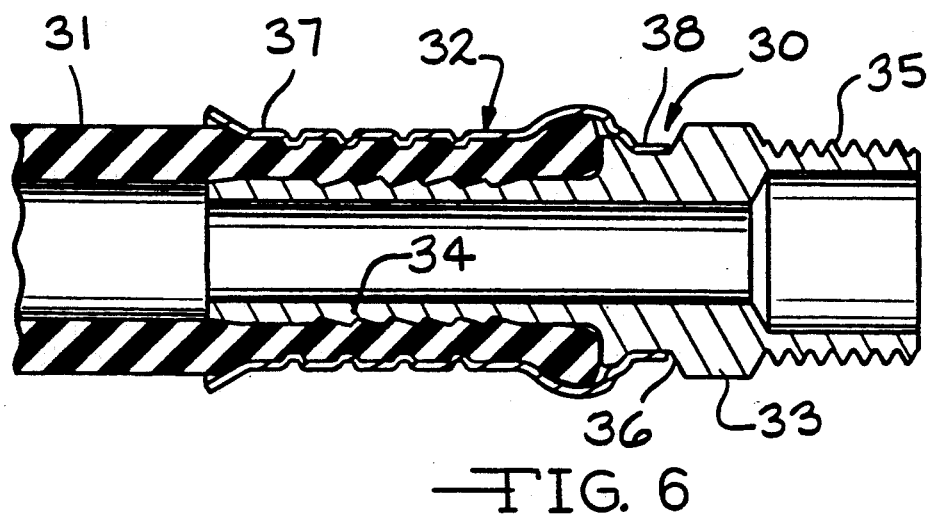
FIG. 6 is a sectional view a hose coupling which includes the collar of FIGS. 4 and 5, and which is crimped to the end of a flexible pressure hose.

Referring now to FIGS. 4, 5 and 6, there is shown (in FIG. 6) a pressure hose coupling 30 which is secured to the end of a flexible pressure hose 31, and which includes a collar 32 constructed in accordance with this invention. The coupling includes a nipple 33 having a toothed inner end 34, an externally threaded outer end 35, and an intermediate section 36. The collar 32 includes a cylindrical metal sleeve 37 having a reduced diameter end 38 which, prior to attachment to the hose 31, is crimped to the intermediate section 36. Together, the toothed inner end 34 and the collar 32 cooperate to form an annular space for receiving the hose end.

The specific construction of the collar 32 is shown in more detail in FIGS. 5 and 6. As mentioned above, the collar 32 includes the cylindrical metal sleeve 37 with the reduced diameter end 38. Further, and in a manner as will be discussed, the collar is formed in a single stamping operation so as to define a plurality of axially spaced apart, annular grooves 40 in the outer surface thereof, and a corresponding number of annular beads 41 in the inner surface directly opposite the grooves. This stamping operation also forms, on each bead, an annular flat surface portion 42 which faces toward the reduced diameter end and function to assist in maintaining the coupling secured to the associated hose in high pressure applications. As shown in FIG. 5, the grooves and beads are not continuous, but are each provided with a plurality of circumferentially spaced interruptions 43 and 44, respectively which are a result of the specific stamping operation used to form the collar.

Figure 7:
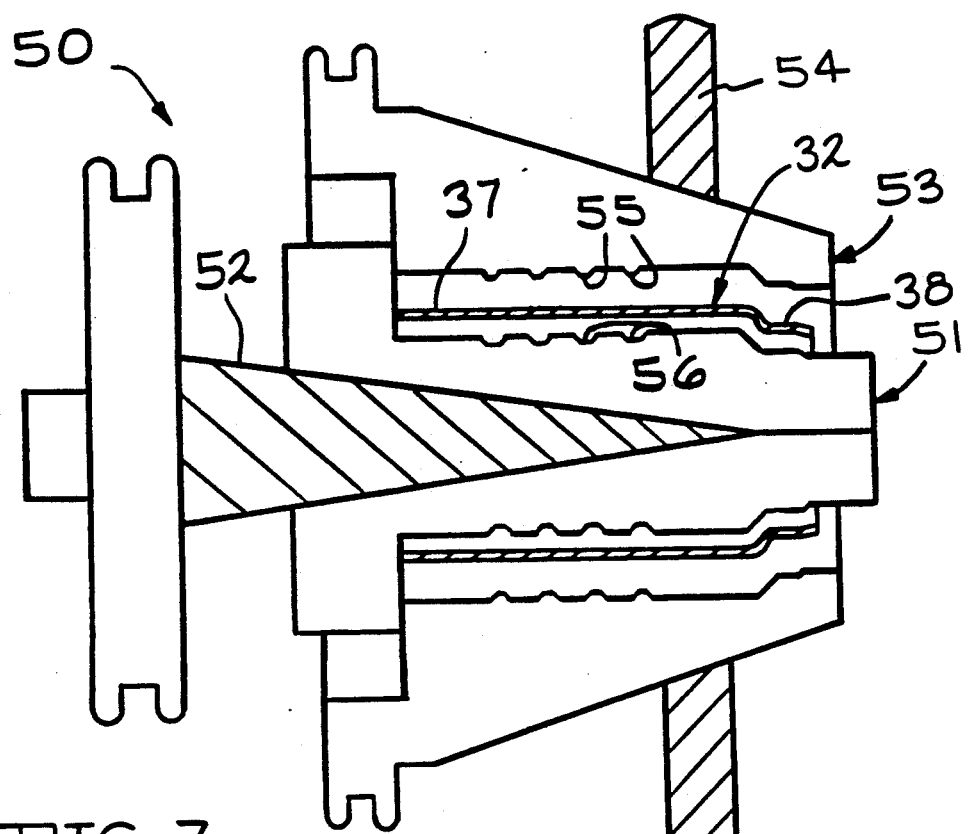
FIG. 7 is a schematic diagram of a forming apparatus used to form the internal beads of the collar by means of a single stamping operation, with the associated die assemblies shown in the retracted position.
Figure 8:
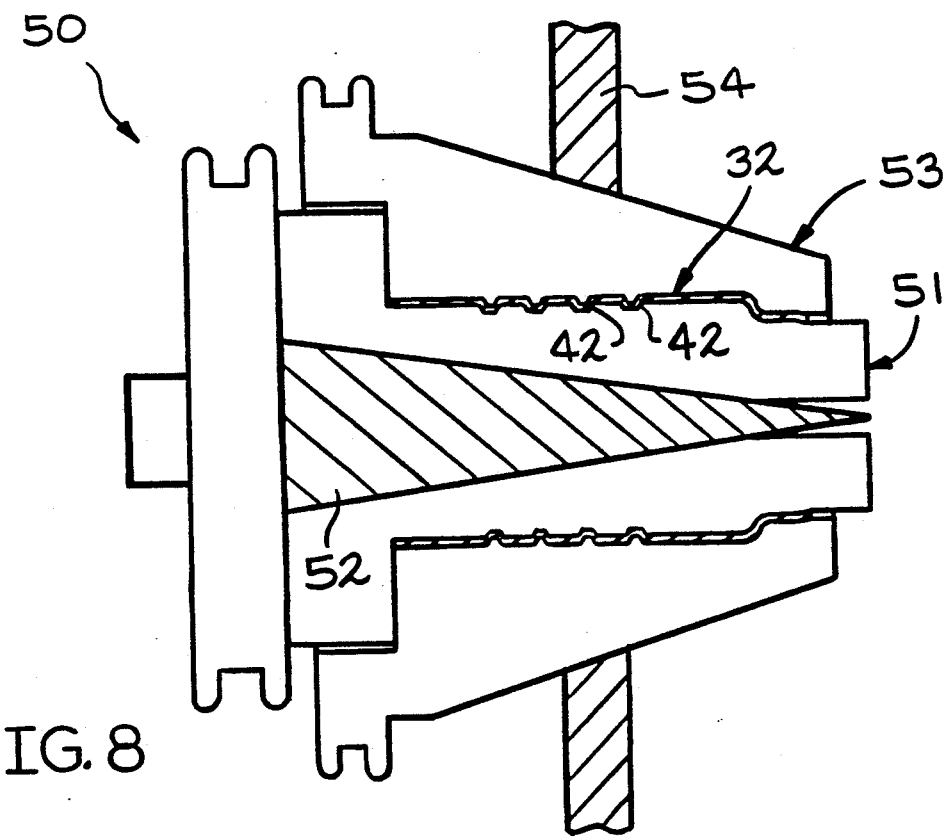
FIG. 8 is a schematic diagram, similar to FIG. 7, but showing the die assemblies in an actuated position.

Referring now to FIGS. 7 and 8, the specific method of fabrication will now be discussed. These figures schematically represent the components of a forming apparatus 50 which functions to simultaneously form the associated grooves and beads by a single stamping operation. In particular, FIG. 7 illustrates the various elements of the apparatus 50 in position immediately before commencement of the stamping operation. As shown, the forming apparatus 50 includes an expandable, segmented inner die assembly 51 and an associated axially shiftable tapered actuating mandrel 52, along with a collapsible, segmented outer die assembly 53 and an associated axially shiftable tapered actuating barrel 54. While not shown in the drawings, it will be appreciated that the mandrel 52 and the barrel 54 can be axially shifted in a conventional manner, such as by hydraulic cylinders.

The outer die assembly includes a plurality of individual segments, each of which is provided with a plurality of internal ribs 55 which, when the barrel 54 is axially shifted toward the left, is adapted to form a circumferential portion of the collar grooves 40. Collectively, all the outer segments cooperate to form the entire circumferential grooves. Similarly, the inner die assembly 51 includes a plurality of external grooves 56 which, when the tapered mandrel is axially shifted toward the right, are adapted to form a circumferential portion of the internal collar beads 41. Further, each of the grooves in the inner die segments are suitably configured to form the annular flat surface portions 42 which assist in gripping the hose. It will be appreciated that, since both the outer and inner die assemblies are segmented, the resulting grooves and beads formed thereby will not be continuous, but will have interruptions, such as 43 and 44 as shown in FIG. 5, which are formed at the junction of the individual segments.

In their unactuated positions, as shown in FIG. 7, the mandrel 52 is in its leftmost position such that the inner die assembly 51 is fully retracted, while the barrel 54 is in its rightmost position such that the outer die assembly 53 is fully retracted. When in these positions, an unformed collar can be inserted in coaxial relationship between the inner and outer die assemblies, as shown in FIG. 7. Thereafter, the mandrel 52 and barrel 54 can be axially shifted, as shown in FIG. 8, to expand the inner die and collapse the outer die assembly, thereby forming the the associated grooves and beads in the collar in a single stamping operation.

The collar of the present invention, along with the method of producing the collar have been illustrated and described in their preferred embodiments. However, it will be appreciated the modifications to these embodiments can be made without departing from the scope of the attached claims.

We claim:

1. A method of producing a hose coupling comprising the steps of:
   (a) providing a cylindrical sleeve;
   (b) simultaneously forming a plurality of annular grooves in the outer surface and a plurality of annular beads opposite the grooves on the inner surface of the sleeve;
   (c) providing a nipple having a cylindrical portion;
   (d) securing the formed sleeve to the nipple such that the cylindrical portion of the nipple extends within the sleeve defining an annular space therebetween; and
   (e) inserting a hollow cylindrical hose into the annular space.

2. The method according to claim 1 wherein step (b) forms each of said annular beads to define a generally annular flat surface portion.

3. The method according to claim 2 wherein step (a) includes the step of providing the metal sleeve with a reduced diameter end portion, and wherein step (b) forms said flat annular surface in generally axial facing relationship to the reduced diameter end portion.

4. The method according to claim 1 wherein step (b) includes the steps of:
   (b1) providing a forming apparatus including a collapsible segmented outer die assembly having a plurality of inwardly projecting annular ribs and a coaxially positioned, expandable segmented inner die assembly having a plurality of cooperating annular grooves;
   (b2) placing the cylindrical sleeve in coaxial relationship between the inner and outer die assemblies; and
   (b3) collapsing the outer die assembly and expanding the inner die assembly to stamp the pluralities of annular beads and annular grooves.

5. The method according to claim 4 wherein step (b) forms each of said beads and said grooves with a plurality of circumferentially spaced interruptions.

6. A hose coupling comprising:
   a cylindrical sleeve, said sleeve having simultaneously a plurality of annular grooves formed in an outer surface thereof and a corresponding number of annular beads formed opposite said grooves on an inner surface thereof, each of said annular beads defining a generally annular flat surface portion, each of said annular flat surface portions defining a plurality of circumferentially spaced interruptions;
   a nipple having a cylindrical portion;
   means for securing said sleeve to said nipple such that said cylindrical portion of said nipple extends within said sleeve defining an annular space therebetween; and
   a hollow cylindrical hose disposed in said annular space and secured to said sleeve and said nipple by crimping said sleeve about said hose and said cylindrical portion of said nipple so that said hose is at least clamped by said preformed annular beads and said cylindrical portion of said nipple.

7. A collar as defined in claim 6 wherein said sleeve includes a reduced diameter portion at one end thereof, and wherein said annular flat surface portions generally face in an axial direction toward said reduced diameter portion.

8. The method according to claim 1 further including the step of crimping a portion of the sleeve about the hose and the cylindrical portion of the nipple.

* * * * *

UNITED STATES PATENT AND TRADEMARK OFFICE
CERTIFICATE OF CORRECTION

PATENT NO. : 5,199,751
DATED : April 6, 1993
INVENTOR(S) : Leo F. Beagle and Richard I. Wermer It is certified that error appears in the above-identified patent and that said Letters Patent is hereby corrected as shown below:

Column 4, Claim 3, Line 2, before "sleeve", delete "metal".

Signed and Sealed this

Thirty-first Day of January, 1995

*Attest:*

BRUCE LEHMAN

*Attesting Officer*     *Commissioner of Patents and Trademarks*